(12) United States Patent
Xia

(10) Patent No.: US 7,474,830 B2
(45) Date of Patent: Jan. 6, 2009

(54) SYSTEM AND METHOD FOR DETERMINING FIBER CHARACTERISTICS

(75) Inventor: Tiejun J. Xia, Richardson, TX (US)

(73) Assignee: Verizon Services Organization, Inc., Irving, TX (US)

( * ) Notice: Subject to any disclaimer, the term of this patent is extended or adjusted under 35 U.S.C. 154(b) by 0 days.

(21) Appl. No.: 11/690,390

(22) Filed: Mar. 23, 2007

(65) Prior Publication Data

US 2008/0232760 A1 Sep. 25, 2008

(51) Int. Cl.
*G02B 6/00* (2006.01)
(52) U.S. Cl. ............................ 385/140; 385/15; 385/24; 385/134
(58) Field of Classification Search ................ 385/15, 385/24, 134, 140
See application file for complete search history.

(56) References Cited

U.S. PATENT DOCUMENTS 6,959,149 B2 * 10/2005 Bragg et al. ................ 398/26

2004/0240042 A1 * 12/2004 Charlet et al. ............... 359/337

* cited by examiner

Primary Examiner—Jennifer Doan

(57) ABSTRACT

A system is provided for characterizing optical fibers carrying signal traffic. The system includes a transmitter, a variable optical attenuator (VOA), a receiver, and a computing device. The transmitter propagates an optical test signal along a channel of a fiber pathway. The VOA adjusts the attenuation of the optical test signal from an initial, greater attenuation to a subsequent, lesser attenuation. At the same time, the computing device monitors at least one other channel of the fiber pathway and identifies effects upon the other channel(s) from the optical test signal. The computing device may communicate with the VOA and with other components of the fiber pathway to direct adjustment of the signal strength. A maximum optical test signal strength may thus be achieved that does not negatively affect signal traffic on the other channels, and the fiber pathway may subsequently be tested using the achieved maximum optical test signal strength.

25 Claims, 5 Drawing Sheets

SYSTEM AND METHOD FOR DETERMINING FIBER CHARACTERISTICS

BACKGROUND

As the pace of life accelerates, more people are demanding fast and reliable access to information, including audio and video content, from their content service providers. As a result, content service providers must find ways to update their systems to support the transmission of larger volumes of content at higher transmission rates. The rate of content transmission is typically described in terms of the bit rate of the connection or transfer. The bit rate is the number of bits that can be conveyed or processed per unit of time (e.g., gigabits per second, or Gb/s).

In fiber optic networks, where bits are conveyed via an optical signal that is propagated along an optical fiber, increasing the bit rate of content transmission is not as simple as pushing more bits per second through the fiber. As the bit rate is increased, for example from 2.5 Gb/s to 40 Gb/s, the sensitivity of the optical signal to attributes of the fiber is heightened. For example, deviations in the cross-section of the fiber and/or twisting of the fiber, which may have no significant effect on optical signals propagated at 2.5 Gb/s, may result in noticeable signal distortions at 40 Gb/s. Fiber attributes may include the optical signal-noise ratio (OSNR), chromatic dispersion (CD), polarization mode dispersion (PMD), pass band shape, and nonlinear effects. As a result, the fiber must be carefully characterized so that the fiber pathway can be tuned to accommodate the faster bit rate before the fiber system is put on-line.

Many fiber optic systems use Wavelength Division Multiplexing (WDM) to combine multiple optical signals on a single fiber, using different wavelengths of light to carry different signals. As an example, one optical fiber may have the capacity to carry eight signals on eight wavelengths, or channels. Most WDM systems are not fully populated, meaning that not all of the channels of a given fiber are carrying signals at any given time. However, using one of the available channels as a test channel for characterizing the fiber's attributes may cause interference with the optical signals carried on the live channels of the same fiber, thereby negatively affecting the quality of the transmission on those channels.

As a result, some have used the characterization of dark fibers, or fibers that carry no signal traffic on any channels, to estimate the properties of other, lit fibers in the same cable. However, although a dark fiber itself may be accurately characterized, the dark fiber may have properties that are slightly different than those of the other fibers, even in the same cable. In addition, as the demand on fiber optic systems increases, the number of dark fibers available for testing decreases, making statistical estimates less reliable.

Thus, there is a need for a system and method for characterizing lit optical fibers, such as in a WDM system, without adversely affecting the transmission performance of the fiber optic system.

BRIEF DESCRIPTION OF THE SEVERAL VIEWS OF THE DRAWING(S)

DETAILED DESCRIPTION

Exemplary embodiments now will be described hereinafter with reference to the accompanying drawings, in which exemplary embodiments and examples are shown. Like numbers refer to like elements throughout.

Apparatuses and methods for characterizing optical fibers carrying signal traffic are provided in accordance with various exemplary embodiments. In general, systems and methods are described for adjusting the attenuation of an optical test signal from a greater level of attenuation, at which, for example, none of the optical test signal is allowed to propagate along a fiber pathway, to a subsequent, lesser level of attenuation, at which, for example, all of the optical test signal is allowed to propagate along the optical fiber. By monitoring the effect of the optical test signal on one or more other channels of the fiber pathway, it may be possible to achieve a maximum optical test signal strength at which the other channels of the fiber pathway, which may be carrying signal traffic, remain unaffected. In this way, a live fiber pathway may be tested using the maximum optical test signal strength without affecting signal traffic being propagated on other channels of the same optical fiber.

Figure 1:
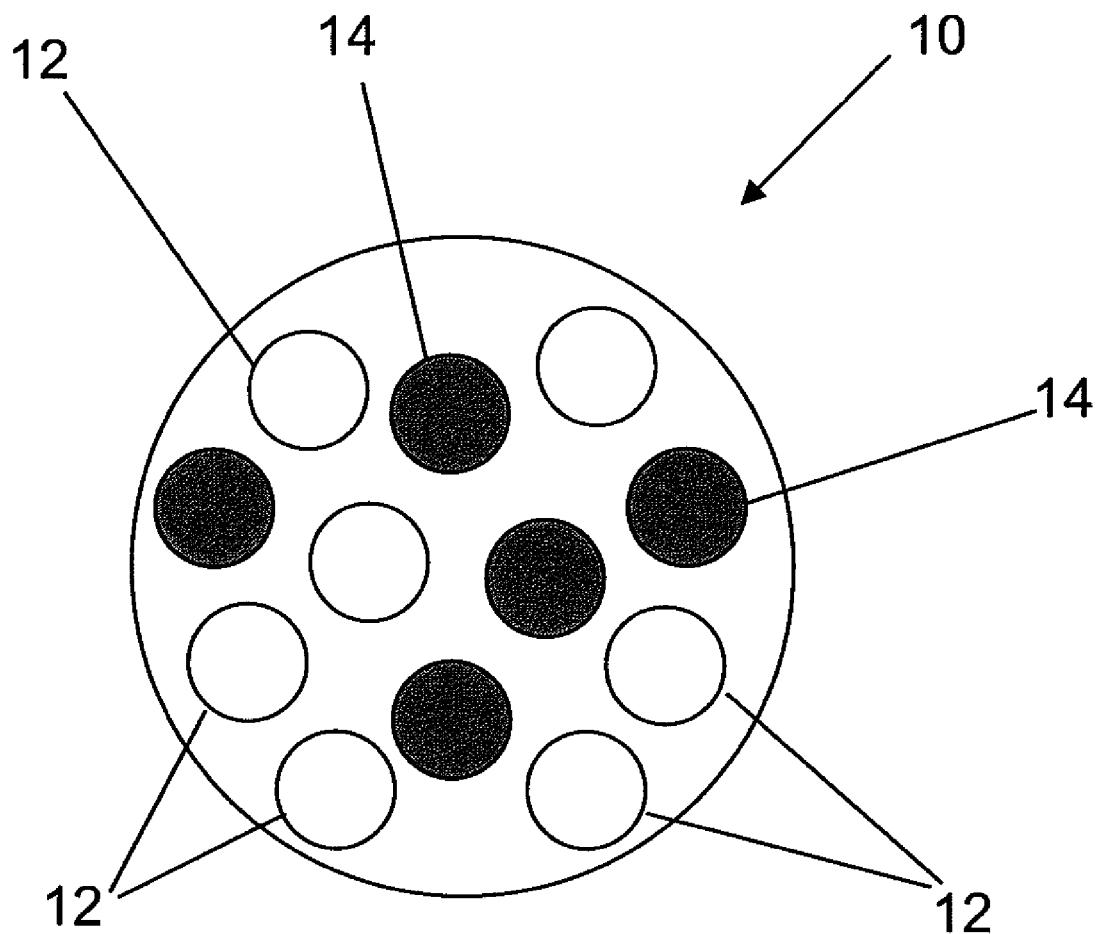
FIG. 1 is a schematic illustration of a fiber optic cable having twelve optical fibers.

Referring to FIG. 1, individual optical fibers may be bundled to form a fiber optic cable 10 to facilitate handling and installation. For example, twelve optical fibers may be bundled together, as in the cable 10 of FIG. 1. A fiber optic cable 10 may include optical fibers that are carrying signal traffic, sometimes called "lit" or "live" fibers 12, as well as optical fibers carrying no signal traffic, called "dark" fibers 14. In Wavelength Division Multiplexing (WDM) systems, multiple signals are multiplexed onto a single fiber with each signal propagating on a different wavelength or channel. At any given time, certain channels within a particular fiber may be lit while others remain dark. Upon reaching a far end of a fiber, signals can be demultiplexed and recovered as is well known.

The testing of optical fibers, including the measurement of certain fiber attributes and characteristics, generally requires the propagation of an optical test signal along the fiber pathway. The fiber pathway is the path followed by an optical signal from one end to another and may include one or more optical fibers, as well as various pieces of equipment such as optical-to-electrical-to-optical translation equipment, multiplexers, optical amplifiers, optical add/drop modules, demultiplexers, and other equipment responsible for maintaining the quality of the signal as it is propagated. When an optical test signal is propagated along a dark channel of a lit optical fiber 12, however, signals being propagated along live channels within the fiber 12 may be adversely affected. For example, depending on the strength of the optical test signal, the optical test signal may interfere with the other signals propagated on the same fiber, thereby degrading the quality of the other signals.

Nonetheless, it is often necessary to test lit optical fibers 12 directly, as alternative testing methods may yield inaccurate results, may be too costly, and/or may disrupt the optical network. For example, testing a dark fiber 14, even a dark fiber in the same cable 10, may be inadequate as the dark fiber 14 may have different characteristics than the actual lit fiber 12. Although the differences may be slight, any inaccurate characterization of the lit fibers 12 may be significant, especially when the lit fibers 12 are being tested in preparation for signal transmission at increasingly higher bit rates, such as 40 Gb/s. In addition, the number of dark fibers 14 in each cable 10 is continually decreasing as more and more optical fibers are being used to carry signal traffic. As a result, the statistical significance of measurements of the dark fibers 14 is continually decreasing.

Alternatively, the characteristics of the optical fibers may be estimated, and the system may then be tuned to adjust for any inaccuracies in the estimations. As previously mentioned, however, even minor inaccuracies in the estimations may significantly affect system performance, especially at higher bit rates, and relying on system tuning processes may be costly from an operations point of view as well as a customer satisfaction point of view. Likewise, routing signal traffic to so-called "protection routes," which are intended as back-up fiber pathways, during testing of the previously lit fibers 12 may make the fiber optic network vulnerable in case of an actual system failure event or disruption as there would be no back-up systems available. Furthermore, characterizing the optical fibers during a maintenance period may result in unacceptable delays to the testing, and the system may need to be shut down during the maintenance period presenting further obstacles to testing.

Figure 2:
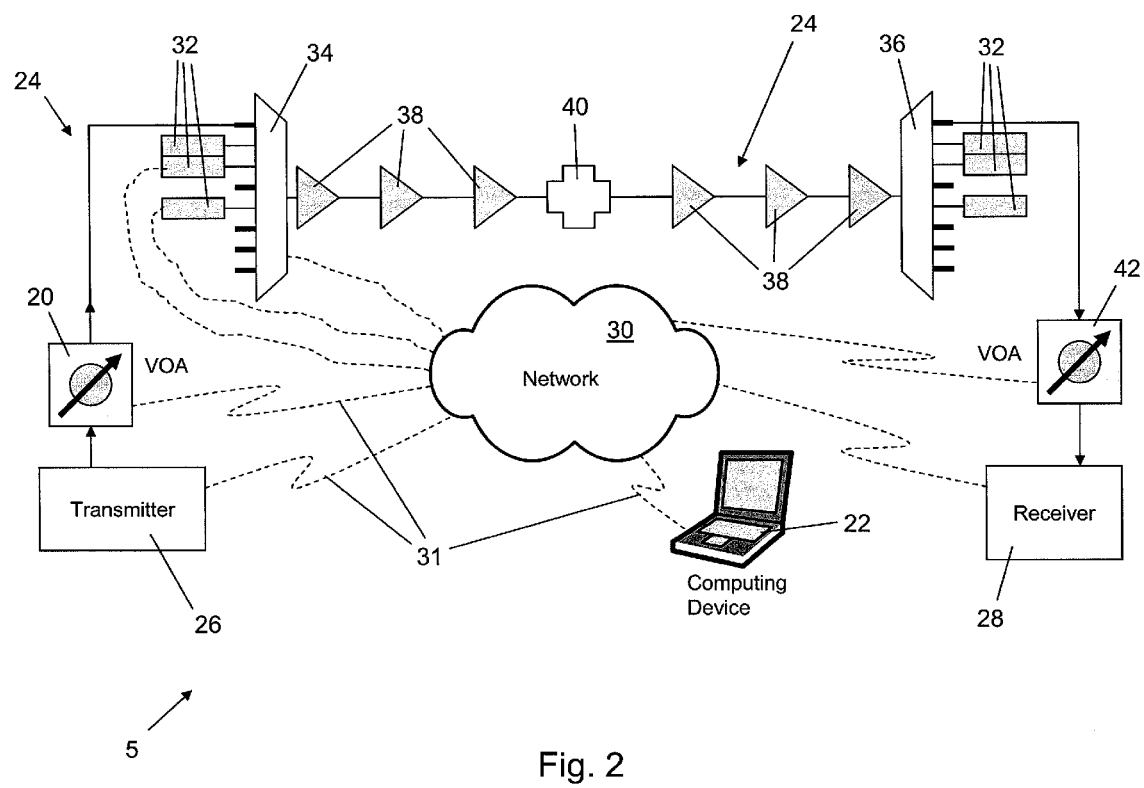
FIG. 2 is a schematic block diagram of a system according to one embodiment showing a second variable optical attenuator.

One of the problems associated with testing lit fibers 12 directly is the risk that the optical test signal will interfere with signal traffic on other channels in the same fiber. Referring to FIG. 2, a system 5 is illustrated according to an exemplary embodiment including a first variable optical attenuator (VOA) 20 configured to adjust attenuation of the optical test signal from an initial, greater attenuation to a subsequent, lesser attenuation. At the same time, a computing device 22 configured to communicate with the first VOA 20 and with other aspects of the fiber pathway 24, as described below, is configured to monitor at least one other channel of the fiber pathway 24 and to identify effects upon the other channel(s) that are attributable to the optical test signal. As will be explained below, a maximum optical test signal strength may thus be achieved that does not negatively affect signal traffic in the other channels, and the fiber pathway may subsequently be tested using the achieved maximum optical test signal strength.

The system 5 according to one embodiment for characterizing optical fibers carrying signal traffic includes a transmitter 26 at a first end of the fiber pathway, the first VOA 20, a receiver 28, and the computing device 22. The transmitter 26 is configured to generate or otherwise provide an optical test signal having a predefined wavelength for propagation along a channel of the fiber pathway 24. The first VOA 20 may be disposed proximate or at the first end of the fiber pathway 24, for example immediately downstream of the transmitter 26 or at least between the transmitter and the first end of the fiber pathway. The first VOA is configured to attenuate the strength of the optical test signal propagated by the transmitter 26. The receiver 28 is configured to receive the optical test signal that has been propagated along the fiber pathway 24 and, as such, may be located at any point downstream of the transmitter 26 and the first VOA 20. For example, the receiver 28 may be located at the other, e.g., opposite, end of the fiber pathway 24, such that a long stretch of the fiber pathway 24 (for example, the fiber pathway 24 extending between two cities) may be tested. Similarly, the receiver 28 may be located at a point along the fiber pathway 24 such that only a portion of the fiber pathway 24, i.e., the portion between the transmitter 26 and the receiver 28 may be tested.

The computing device 22 is generally configured to communicate with the transmitter 26, the first VOA 20, and the receiver 28. The computing device 22 may be a laptop computer, personal computer, server computer, workstation, or any computerized device capable of performing the functions described below in relation to the computing device. As previously mentioned, the computing device 22 is configured to monitor at least one other channel and to identify effects upon the other channel(s). For example, as illustrated in FIG. 2, the computing device 22 may be connected to a communications network 30, such as the Internet or other type of network, that supports the communication of data between the computing device 22 and the various components of the system 5. The connection 31 may be wireless, e.g., using radio frequency (RF), Bluetooth (BT), infrared (IrDA), or other wireless communication techniques, or the connection may be wired, e.g., using optical fiber or copper wire to transmit data. In any case, the computing device 22 may, for example, receive data indicating a condition of the channel(s) carrying signal traffic from at least the receiver 28. Furthermore, the computing device 22 may direct the first VOA 20 regarding how to adjust the attenuation of the optical test signal in response to the data received. The computing device 22 may also direct other components of the system 5, such as the transmitter 26 and the receiver 28.

For example, the computing device 22 may initially direct the first VOA 20 to attenuate all or substantially all of the optical test signal to be propagated along the fiber pathway 24. The computing device 22 may then direct the transmitter 26 to generate or otherwise provide the optical test signal for propagation along the optical fiber following attenuation by the first VOA 20. The computing device 22 may direct the transmitter 26, the first VOA 20, and/or other components automatically, e.g., according to instructions embodied in a software program executed by a processing element, or according to input provided by a user, e.g., via a keyboard, mouse, or other input device. Once signals are propagated along the optical fiber, the computing device monitors one or more channels of the fiber pathway 24, that is, the channels other than that channel via which the optical test signal is propagated. As the computing device 22 continues to monitor the one or more channels carrying signal traffic in the fiber being tested, the computing device 22 may direct the first VOA 20 to gradually decrease attenuation of the optical test signal. As long as the computing device 22 receives no indication that the signal traffic of the live channels is negatively affected, the computing device 22 may continue to direct the first VOA 20 to decrease attenuation of the optical test signal until, for example, the attenuation reaches zero or a value close to zero. In the case where there is no attenuation or substantially no attenuation, the optical test signal may be propagated along the fiber pathway 24 at a maximum signal strength (i.e., without any attenuation), and the appropriate tests for characterizing the fiber pathway 24 may be conducted at that maximum signal strength or any lesser strength, as required by the specific tests or measurements.

Similarly, the computing device 22 may be configured to direct the first VOA 20 to stop adjusting attenuation of the optical test signal when a predefined optical test signal strength is achieved. For example, various tests for determining different characteristics of the fiber may require different optical test signal strengths. However, once the optical test signal strength corresponding to the highest strength required is propagated along the fiber pathway 24 without any adverse effects on the other channels, there is no further need to achieve higher signal strengths as all testing may be conducted using the achieved optical test signal strength. Thus, there would be no need to further decrease attenuation of the optical test signal.

The computing device 22 may be configured to direct the first VOA 20 to stop decreasing the attenuation of the optical test signal when the effects upon the monitored channels result in a predefined alarm condition. For example, the computing device 22 may be configured to monitor the strength of the signal traffic on the live channels at one or more points along the fiber pathway 24. A decrease in the strength below a certain threshold level may result in an alarm condition, at which point the first VOA 20 would be stopped from further decreasing the attenuation of the optical test signal to prevent additional adverse effects on the live channels. The alarm condition may be defined in other manners. For example, the quality of the signal traffic on the live channels may be monitored, such as by monitoring the signal-to-noise ratio, and an indication of a signal quality that falls below a certain threshold level may cause the computing device 22 to direct the first VOA 20 to cease decreasing the attenuation of the optical test signal. Furthermore, in any of these examples, the computing device 22 may direct the VOA 20 to increase attenuation of the optical test signal until the respective alarm condition is cleared. In this way, the maximum optical test signal strength at which no alarm conditions are caused may be achieved.

As another example, the computing device 22 may be configured to monitor a bit error rate of the other channel(s) of the fiber pathway 24. The computing device 22 may be further configured to direct the first VOA 20 to adjust attenuation of the optical test signal to allow propagation of the test signal at a strength at which the bit error rate of the live channels is below a predetermined level. For example, it may be determined that a bit error rate of $10^{-9}$ is the highest acceptable bit error rate. Thus, in this example, any bit error rate higher than $10^{-9}$ would result in the computing device 22 directing the first VOA 20 to cease decreasing attenuation of the optical test signal. Also, as described above with respect to alarm conditions, the computing device 22 may direct the VOA 20 to increase attenuation of the optical test signal until the bit error rate falls below a predetermined threshold level. In this way, the maximum optical test signal strength at which the bit error rate is acceptable may be achieved. Regarding bit error rates as well as alarm conditions, it is to be understood that the maximum achieved optical test signal strength may be less than the required optical test signal strength for certain tests, and so it may not be possible to perform all required tests on the lit fiber.

The computing device 22 may be capable of monitoring other parameters in addition to those mentioned above to determine the effect of the optical test signal on the other channels. Furthermore, the computing device 22 may be capable of monitoring multiple parameters and may determine the effect of the optical test signal on the other channels based on a combination of parameters.

Figure 3:
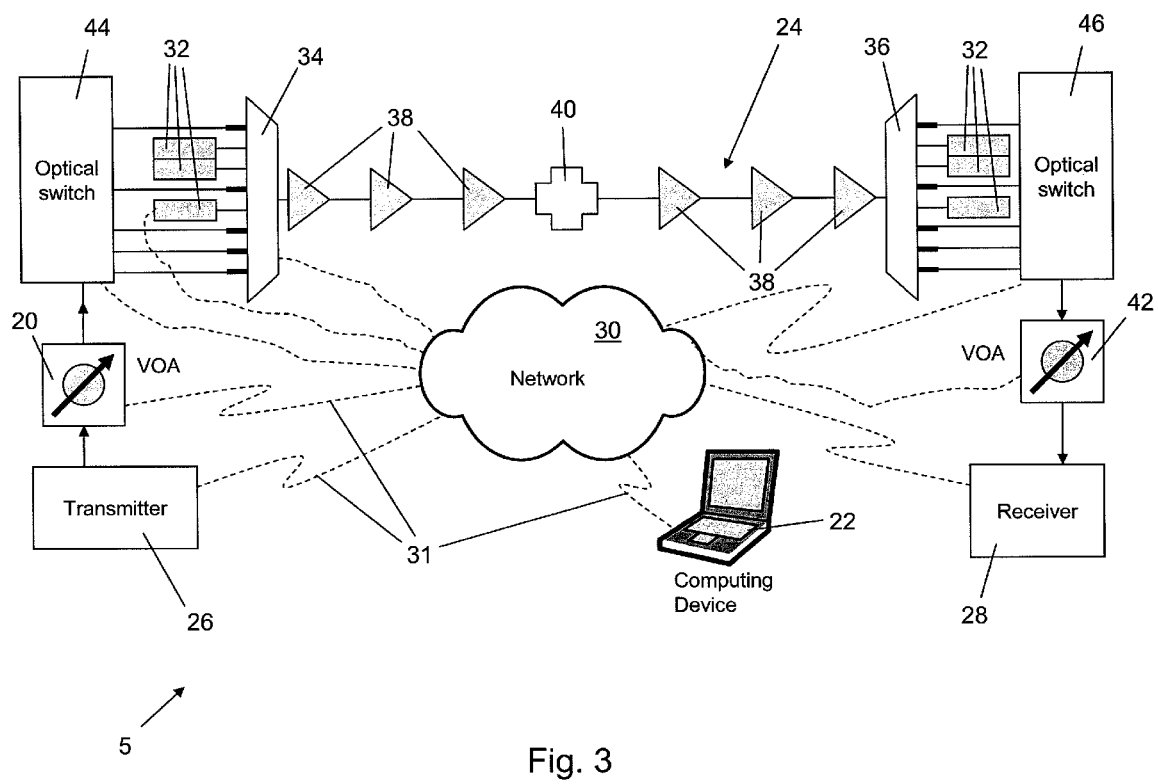
FIG. 3 is a schematic block diagram of a system according to one embodiment showing a pair of optical switches.
Figure 4:
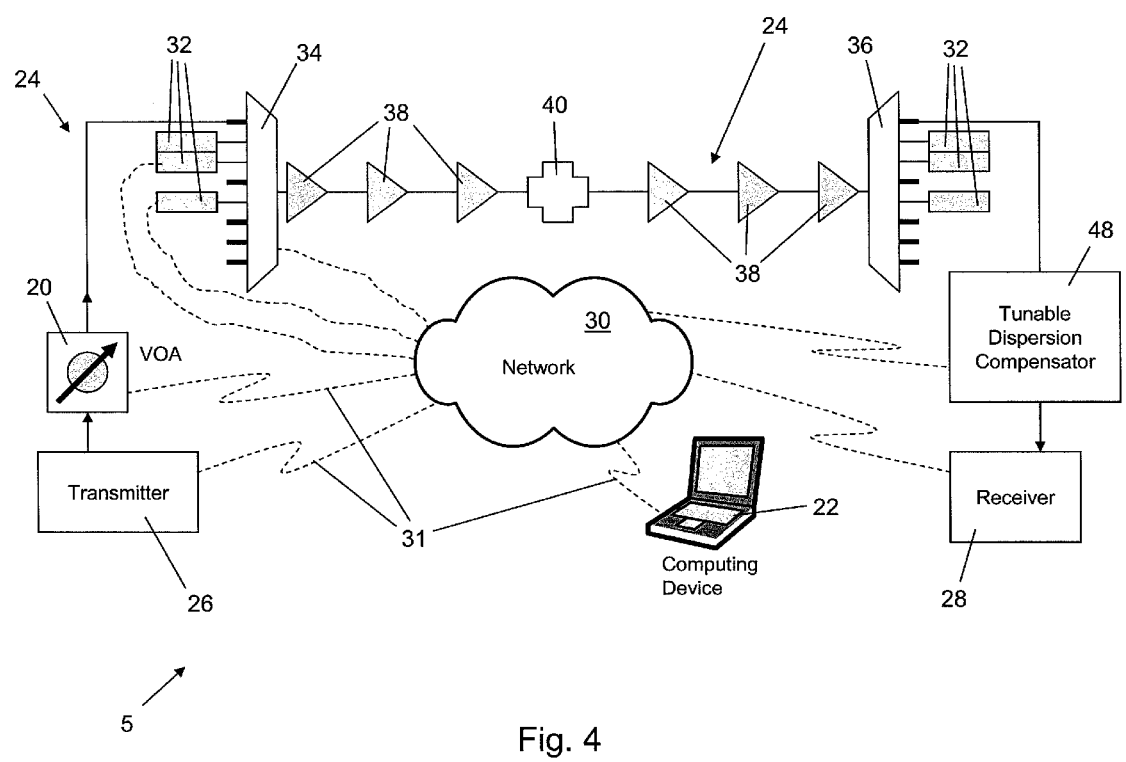
FIG. 4 is a schematic block diagram of a system according to one embodiment showing a tunable dispersion compensator.

As shown in FIGS. 2, 3, and 4, the system 5 may include components along the fiber pathway 24 in addition to the transmitter 26, the first VOA 20, and the receiver 28. For example, equipment for optical-to-electrical-to-optical (o/e/o) translation 32 may be included for processing signal traffic information. In FIGS. 2, 3, and 4, for example, two o/e/o nodes are included, each node having three o/e/o units 32, or one pair of o/e/o units 32 for each live channel of the fiber pathway 24. Thus, in the figures, five of eight channels are dark and may be tested. The system 5 may also include a multiplexer 34 and a demultiplexer 36 between the o/e/o units 32. As previously discussed, the multiplexer 34 may be configured to multiplex, or join, signals onto channels of the fiber pathway 24. The multiplexer 34 may be disposed at the first end of the fiber pathway 24, for example downstream of the o/e/o units 32. The demultiplexer 36 may be configured to demultiplex, or split apart, signals from channels of the fiber pathway 24, such that each signal would continue propagation along the fiber pathway 24 on a separate optical fiber (not shown). Thus the demultiplexer 36 may be disposed between an end of the fiber pathway 24 and the receiver 28, for example as shown in FIG. 2.

Between the multiplexer 34 and the demultiplexer 36, additional components may be included to maintain the quality of the signals and otherwise manage signal traffic along the fiber pathway 24. For example, a number of optical amplifiers 38 may be included to insure that the strength of signals propagated from one end of the fiber pathway 24 to another end is at an appropriate level for downstream processing. In addition, one or more optical add/drop modules 40 may be included for adding and/or dropping certain channels along the fiber pathway 24.

In some embodiments, a second VOA 42 may be disposed at another location of the fiber pathway 24. The second VOA 42 may be configured to communicate with the computing device 22 and to adjust attenuation of the optical test signal from an initial, greater attenuation to a subsequent, lesser attenuation. For example, in FIG. 2, the second VOA 42 is disposed upstream of the receiver 28 and is configured to attenuate the optical test signal to reduce interference of the reflected test signal with signal traffic on other channels. For example, part of the optical test signal may be reflected by the receiver 28 back toward the demultiplexer 36, causing interference with other channels. By adjusting the attenuation of the second VOA 42, for example as directed by the computing device 22, the second VOA 42 can provide additional protection for the live signal traffic.

Referring to FIG. 3, the system 5 may also include first and second optical switches 44, 46 configured to select a channel of the fiber pathway 24 for propagation of the optical test signal. For example, the first optical switch may be disposed between the first VOA 20 and the multiplexer 34, and the second optical switch 46 may be disposed between the second VOA 42 and the demultiplexer 36, as shown in FIG. 3. The first and second optical switches 44, 46 may be configured to communicate with the computing device 22 such that the computing device 22 may direct the optical switches 44, 46 to select a channel (i.e., a dark channel) of the fiber pathway 24 over which the optical test signal may be propagated. In this way, multiple channel tests may be supported.

Other components of the fiber pathway 24 may vary depending on the measurements or tests to be performed on the system. For example, the spectral response of the fiber pathway 24 may be measured by a transmitter 26 including a broadband source. The broadband source may be configured to propagate optical test signals having a respective wavelength along the fiber pathway 24. The receiver 28 may include an optical spectrum analyzer configured to analyze a wavelength spectrum of the optical test signal. In this way, the optical signal-to-noise ratio, pass band shape, and other characteristics of the fiber may be determined. Similarly, the receiver may include a polarization mode dispersion analyzer configured to measure a polarization mode dispersion of the optical test signal.

In another example, the system 5 may include a tunable dispersion compensator 48 disposed between an end of the fiber pathway 24 and the receiver 28. For example, in FIG. 4, the tunable dispersion compensator 48 is disposed between the demultiplexer 36 and the receiver 28. The tunable dispersion compensator 48 is configured to adjust the dispersion compensation function of the optical test signal, for example to compensate for the chromatic dispersion of signals propagating along the fiber pathway 24 as a result of fiber imperfections.

Figure 5:
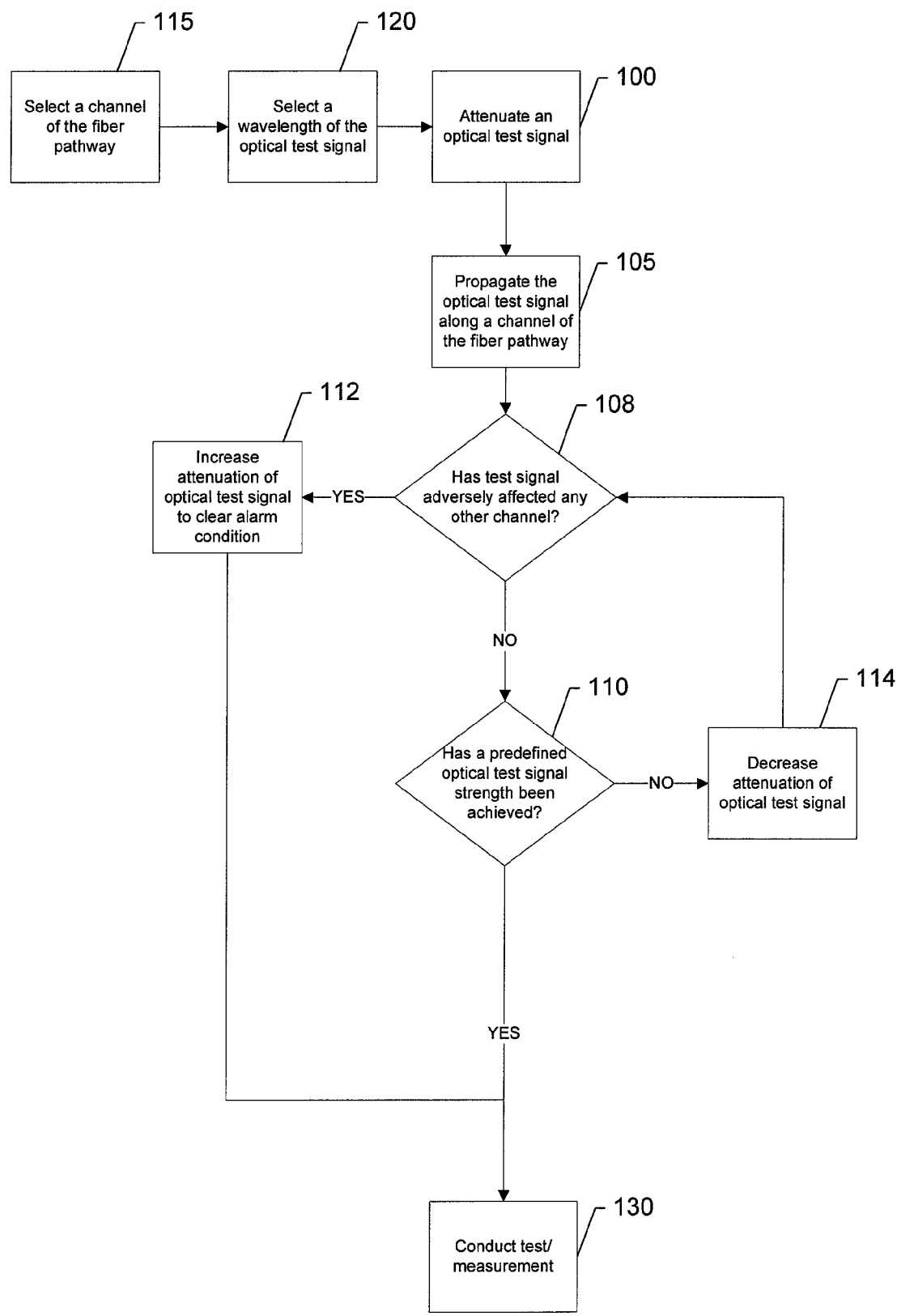
FIG. 5 is a flow chart illustrating embodiments of a method for characterizing optical fibers carrying signal traffic according to one embodiment.

In other embodiments, a method for characterizing optical fibers carrying signal traffic is provided. An optical test signal is selectably attenuated prior to propagation along a channel of a fiber pathway. The optical test signal is then propagated along the channel of the fiber pathway, and the attenuation of the optical test signal is adjusted from an initial, greater attenuation to a subsequent, lesser attenuation while at least one other channel of the fiber pathway is monitored and effects upon the other channel(s) from the optical test signal are identified. See FIG. 5, blocks 100-110.

For example, as previously described, the attenuation of the optical test signal may initially be set at a very high value, such that when the optical test signal is propagated substantially all of the test signal is attenuated. Attenuation of the optical test signal may then be gradually decreased, allowing more of the optical test signal to be propagated along the fiber pathway.

The attenuation of the optical test signal may continue to be adjusted until one of several situations arises, indicating that a maximum optical test signal strength has been achieved. For example, the effects upon the other channel(s) being monitored may result in a predefined alarm condition, as discussed above, indicating that the optical test signal has adversely affected one or more other channels. Block 108. In this situation, adjusting the attenuation of the optical test signal may include stopping the decrease of attenuation of the optical test signal when the effects upon the other channel(s) results in the predefined alarm condition, and then increasing the attenuation until the predefined alarm condition is cleared. Block 112. In this way, a maximum signal strength at which no alarm condition is triggered may be achieved.

Even if the optical test signal does not adversely affect any other channel, a predefined optical test signal strength may be achieved, such as the highest test signal strength that can be propagated by the transmitter or the test signal strength required to perform one or more tests or measurements on the system, as previously described. Block 110. In this case, a further decrease in attenuation of the optical test signal strength, as shown in block 114, may not be possible or necessary.

In determining whether the optical test signal strength has adversely affected any other channel, a bit error rate of the other channel(s) may be monitored, and attenuation of the optical test signal may be adjusted such that the signal strength results in a bit error rate of the other channel(s) that is below a predetermined level. For example, attenuation of the optical test signal may continue to be decreased until the bit error rate reaches a certain value (e.g., a maximum acceptable bit error rate), at which point the attenuation may be stopped. In this way, the maximum optical test signal strength at which the resulting bit error rate of the other channel(s) is acceptable may be achieved.

In some embodiments, a channel of the fiber pathway may be selected prior to the attenuation and propagation of the optical test signal, as shown in block 115. This may facilitate multiple channel tests according to this method. In addition, a wavelength of the optical test signal may be selected, block 120, for example to support measurements of the optical signal-to-noise ratio, pass band shape, and other fiber characteristics via an analysis of the wavelength spectrum of the optical test signal, block 130. Likewise, a polarization mode dispersion of the optical test signal may be measured, as previously discussed. Block 130.

Furthermore, attenuation of the optical test signal at another location along the fiber pathway may be adjusted from an initial, greater attenuation to a subsequent, lesser attenuation. See blocks 100, 112, 114. As previously discussed, attenuation of the optical test signal at another location may reduce or safeguard against the interference of the test signal with the live signal traffic on other channels of the optical fiber. For example, attenuation of the optical test signal upstream of a receiver at an end of the fiber pathway may reduce the interference caused by a portion of the optical test signal that may be reflected by the receiver.

In the preceding specification, various embodiments have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system comprising:
    a transmitter at a first end of a fiber pathway composed of at least one optical fiber configured to propagate an optical test signal along a channel of the fiber pathway;
    a first variable optical attenuator disposed at the first end of the fiber pathway and configured to attenuate the strength of the optical test signal propagated by the transmitter;
    a receiver configured to receive the optical test signal that has been propagated along the fiber pathway; and
    a computing device configured to communicate with the transmitter, the first variable optical attenuator, and the receiver;
    wherein the computing device is configured
        to monitor at least one other channel of the fiber pathway and
        to identify effects upon the at least one other channel resulting from attenuation of the optical test signal, and
        to generate a data indicator if one or more effects are identified; and
        wherein the first variable optical attenuator is configured to adjust attenuation of the optical test signal while the computing device monitors the effects upon the at least one other channel.

2. The system of claim 1, wherein the first variable optical attenuator is configured to adjust attenuation of the optical test signal from an initial, greater attenuation to a subsequent, lesser attenuation.

3. The system of claim 1 further comprising a second variable optical attenuator disposed at another location of the fiber pathway and configured to communicate with the computing device and to adjust attenuation of the optical test signal.

4. The system of claim 3, wherein the second variable optical attenuator is configured to adjust attenuation of the optical test signal from an initial, greater attenuation to a subsequent, lesser attenuation.

5. The system of claim 3 further comprising:
    a multiplexer disposed at the first end of the fiber pathway and configured to multiplex signals onto channels of the fiber pathway;
    a first optical switch disposed between the first variable optical attenuator and the multiplexer;

a demultiplexer disposed between an end of the fiber pathway and the receiver and configured to demultiplex signals from channels of the fiber pathway; and a second optical switch disposed between the second variable optical attenuator and the demultiplexer;

wherein the first and second optical switches are responsive to the computing device to select a channel of the fiber pathway for propagation of the optical test signal.

6. The system of claim 1, wherein the computing device is configured to direct the first variable optical attenuator to stop decreasing attenuation of the optical test signal when the effects upon the at least one other channel result in a predefined alarm condition.

7. The system of claim 1, wherein the computing device is configured to monitor a bit error rate of the at least one other channel of the fiber pathway and to direct the first variable optical attenuator to adjust attenuation of the optical test signal to allow propagation of the optical test signal at a strength at which the bit error rate of the at least one other channel is below a predetermined level.

8. The system of claim 1, wherein the computing device is configured to direct the first variable optical attenuator to stop adjusting attenuation of the optical test signal when a predefined optical test signal strength is achieved.

9. The system of claim 1, wherein the transmitter comprises a broadband source configured to propagate optical test signals having a respective wavelength along the fiber pathway.

10. The system of claim 9, wherein the receiver comprises an optical spectrum analyzer configured to analyze a wavelength spectrum of the optical test signal.

11. The system of claim 9, wherein the receiver comprises a polarization mode dispersion analyzer configured to measure a polarization mode dispersion of the optical test signal.

12. The system of claim 1 further comprising a tunable dispersion compensator disposed between an end of the fiber pathway and the receiver and configured to adjust a dispersion compensation function of the optical test signal.

13. A method comprising:

selectably attenuating an optical test signal prior to propagation along a channel of a fiber pathway;

propagating the optical test signal along the channel of the fiber pathway;

adjusting attenuation of the optical test signal while monitoring at least one other channel of the fiber pathway;

identifying effects upon the at least one other channel resulting from attenuation of the optical test signal; and generating a data indicator if one or more effects are identified.

14. The method of claim 13, wherein adjusting attenuation of the optical test signal comprises adjusting attenuation from an initial, greater attenuation to a subsequent, lesser attenuation.

15. The method of claim 13 further comprising adjusting attenuation of the optical test signal at another location along the fiber pathway.

16. The method of claim 15, wherein adjusting attenuation of the optical test signal at the other location comprises adjusting attenuation at the other location from an initial, greater attenuation to a subsequent, lesser attenuation.

17. The method of claim 13 further comprising selecting a channel of the fiber pathway along which to propagate the optical test signal.

18. The method of claim 13, wherein adjusting attenuation of the optical test signal comprises stopping a decrease of attenuation of the optical test signal when the effects upon the at least one other channel result in a predefined alarm condition.

19. The method of claim 18, wherein adjusting attenuation of the optical test signal comprises increasing attenuation of the optical test signal until the predefined alarm condition is cleared.

20. The method of claim 13, wherein adjusting attenuation of the optical test signal comprises monitoring a bit error rate of the at least one other channel and adjusting attenuation to allow propagation of the optical test signal at a strength at which the bit error rate of the at least one other channel is below a predetermined level.

21. The method of claim 13 further comprising ceasing to adjust attenuation of the optical test signal when a predefined optical test signal strength is achieved.

22. The method of claim 13, wherein propagating the optical test signal comprises selecting a wavelength of the optical test signal.

23. The method of claim 22 further comprising analyzing a wavelength spectrum of the optical test signal.

24. The method of claim 22 further comprising measuring a polarization mode dispersion of the optical test signal.

25. The method of claim 13 further comprising adjusting a dispersion compensation function of the optical test signal.

* * * * *